(12) United States Patent
Slabbekoorn et al.

(10) Patent No.: US 11,481,745 B2
(45) Date of Patent: Oct. 25, 2022

(54) FUEL DISPENSER HAVING SELECTIVELY VIEWABLE SECONDARY DISPLAY

(71) Applicant: Gilbarco Inc., Greensboro, NC (US)

(72) Inventors: Scott D. Slabbekoorn, Greensboro, NC (US); Felix La Pietra, Bellmore, NY (US); Anny Liao, Stokesdale, NC (US); Edward Asbell Payne, Kernersville, NC (US)

(73) Assignee: Gilbarco Inc., Greensboro, NC (US)

( * ) Notice: Subject to any disclaimer, the term of this patent is extended or adjusted under 35 U.S.C. 154(b) by 311 days.

(21) Appl. No.: 16/706,213

(22) Filed: Dec. 6, 2019

(65) Prior Publication Data
US 2021/0174323 A1    Jun. 10, 2021

(51) Int. Cl.
| G06Q 20/20 | (2012.01) |
| G06Q 20/18 | (2012.01) |
| B67D 7/08 | (2010.01) |
| B67D 7/04 | (2010.01) |
| G06Q 50/06 | (2012.01) |
| G06F 3/0481 | (2022.01) |

(52) U.S. Cl.
CPC .............. *G06Q 20/20* (2013.01); *B67D 7/04* (2013.01); *B67D 7/08* (2013.01); *G06Q 20/18* (2013.01); *G06F 3/0481* (2013.01); *G06Q 50/06* (2013.01)

(58) Field of Classification Search
CPC . B67D 7/04; B67D 7/08; B67D 7/228; B67D 7/22; B67D 7/62; B67D 7/246; G06Q 50/06; G06Q 20/18; G06Q 20/20; G06Q 20/3278; G06Q 20/342; G06Q 20/363; G06F 3/04845
See application file for complete search history.

(56) References Cited

U.S. PATENT DOCUMENTS

| 4,642,627 | A | 2/1987 | Hodsdon |
| 5,689,071 | A | 11/1997 | Ruffner et al. |
| 5,734,851 | A | 3/1998 | Leatherman et al. |
| 5,956,259 | A | 9/1999 | Hartsell, Jr. et al. |
| 6,052,629 | A | 4/2000 | Leatherman et al. |
| 6,380,853 | B1 * | 4/2002 | Long .................... G07F 13/025 340/5.91 |
| 6,435,204 | B2 | 8/2002 | White et al. |
| 6,935,191 | B2 * | 8/2005 | Olivier .................... G01F 1/12 702/45 |

(Continued)

OTHER PUBLICATIONS

International Search Report and the Written Opinion of the International Searching Authority dated Mar. 3, 2021 in PCT/US20/63367.

*Primary Examiner* — Timothy L Maust
(74) *Attorney, Agent, or Firm* — Nelson Mullins Riley & Scarborough LLP

(57) ABSTRACT

A fuel dispenser comprises a housing enclosing fluid handling components including a fluid flow meter. The housing has a user interface including a panel display. A control system is in electrical communication with the user interface and is operative to display money and volume information on the panel display during a fueling transaction. A secondary display having digit structure that registers fuel dispensing information is in electrical communication with the control system. The secondary display is configured to not be viewable by a customer during a fueling transaction.

23 Claims, 6 Drawing Sheets

(56) References Cited

U.S. PATENT DOCUMENTS

| | | | |
|---|---|---|---|
| 7,280,087 B2 * | 10/2007 | Williams | G06Q 30/02 |
| | | | 715/740 |
| 7,289,877 B2 | 10/2007 | Wilson | |
| 7,774,231 B2 | 8/2010 | Pond et al. | |
| 8,392,846 B2 | 3/2013 | Carapelli | |
| 10,019,953 B2 | 7/2018 | Payne et al. | |
| 10,346,015 B2 * | 7/2019 | Martensson | G06F 3/0482 |
| 2009/0048710 A1 | 2/2009 | Deline | |
| 2010/0017040 A1 * | 1/2010 | Shuler | G07F 9/026 |
| | | | 349/1 |
| 2010/0268612 A1 | 10/2010 | Berrio et al. | |
| 2011/0273371 A1 * | 11/2011 | Payne | G02F 1/167 |
| | | | 700/244 |
| 2013/0246171 A1 | 9/2013 | Carapelli | |
| 2014/0071073 A1 * | 3/2014 | Williams | G09G 3/344 |
| | | | 345/173 |
| 2015/0138184 A1 | 5/2015 | Bilbrey et al. | |
| 2016/0148230 A1 * | 5/2016 | Zeiger | G06Q 30/0217 |
| | | | 705/7.32 |
| 2017/0275148 A1 | 9/2017 | Williams et al. | |
| 2017/0344233 A1 | 11/2017 | Martensson et al. | |

\* cited by examiner

FUEL DISPENSER HAVING SELECTIVELY VIEWABLE SECONDARY DISPLAY

FIELD OF THE INVENTION

The present invention relates generally to fuel dispensers. More particularly, the present invention relates to a fuel dispenser in which a secondary display may be normally opaque but becomes viewable in certain situations.

BACKGROUND

Multimedia displays are becoming more prevalent in fuel dispensers as a way to entertain customers, advertise, and encourage customers to come into the convenience store. The multimedia displays tend to be separate from the money, volume, and rate displays which are generally LCD displays with LED backlights. LCD displays are preferred because they can be easily designed to hold the content for 15 minutes after a power outage (which is a regulatory weights and measures requirement). Use of the multimedia displays to also show money, volume, and rate information is generally considered impractical because it would require a large battery and presents other difficult technical solutions.

SUMMARY

The present invention recognizes and addresses the foregoing considerations, and others, of prior art construction and methods. In this regard, certain exemplary and non-limiting aspects of the present invention will now be described. These aspects are intended to provide some context for certain principles associated with the present invention, but are not intended to be defining of the full scope of the present invention.

Certain aspects of the present invention are directed to fuel dispenser displays that satisfy weights and measures requirements to show money, volume, and/or rate information for a period of time after a power outage. Examples of retail fueling environments, fuel dispensers, and user interfaces for fuel dispensers are provided in U.S. Pat. No. 6,453,204 (entitled "Fuel Dispensing System"), U.S. Pat. No. 5,956,259 (entitled "Intelligent Fueling"), U.S. Pat. No. 5,734,851 (entitled "Multimedia Video/Graphics in Fuel Dispensers"), U.S. Pat. No. 6,052,629 (entitled "Internet Capable Browser Dispenser Architecture"), U.S. Pat. No. 5,689,071 (entitled "Wide Range, High Accuracy Flow Meter"), U.S. Pat. No. 6,935,191 (entitled "Fuel Dispenser Fuel Flow Meter Device, System and Method"), U.S. Pat. No. 7,289,877 (entitled "Fuel Dispensing System for Cash Customers"), U.S. Pat. No. 7,774,231 (entitled "Electronic Payment Methods for a Mobile Device") and U.S. Pat. No. 8,392,846 (entitled "Virtual PIN Pad for Fuel Payment Systems"), and U.S. published patent application nos. 20090048710 (entitled "Fuel Dispenser") and 20100268612 (entitled "Payment Processing System for Use in a Retail Environment Having Segmented Architecture"). The entire disclosure of each of the foregoing patents and applications is hereby incorporated by reference as if set forth verbatim herein for all purposes.

According to one aspect, the present invention provides a fuel dispenser comprising a housing enclosing fluid handling components including a fluid flow meter. The housing has a user interface including a panel display. A control system is in electrical communication with the user interface and is operative to display money and volume information on the panel display during a fueling transaction. A secondary display having digit structure that registers fuel dispensing information is in electrical communication with the control system. The secondary display is configured to not be viewable by a customer during a fueling transaction.

In some exemplary embodiments, the secondary display has an electrically controllable mask interposing the digit structure of the secondary display. The electrically controllable mask is substantially opaque when activated, for example, via at least one of an applied opacity signal or applied power. Moreover, the electrically controllable mask may become transparent when applied power is lost.

In some exemplary embodiments, the secondary display may comprise a backlit LCD panel forming the digit structure. In other embodiments, the secondary display may comprise a negative LCD panel having a darker background when activated and lighter digits when activated. The fuel dispensing information registered by the digit structure may, for example, comprise money and volume information or may comprise fuel totalizer information. Digits of the secondary display may preferably be approximately 10 mm tall. Often, the user interface may further include a plurality of grade selectors corresponding to respective fuel grades or types.

According to another aspect, the present invention provides a display assembly having a multilayer structure comprising a first LCD panel in the form of an information display operative to register digits. Also provided is a second LCD panel juxtaposed to the first LCD panel, the second LCD panel configured as an electrically controllable mask to be substantially opaque when activated so as to conceal digits of the first LCD panel.

A still further aspect of the present invention provides a method of displaying fuel dispensing information on a fuel dispenser. A step of the method involves providing a fuel dispenser having a panel display and a control system operative to display money and volume information on the panel display during a fueling transaction. A secondary display is in electrical communication with the control system, the secondary display having digit structure that registers the fuel dispensing information. The secondary display is configured to be substantially opaque when an opacity signal is applied thereto so as to not be viewable by a customer but viewable by the customer when the opacity signal is not applied thereto. Another step of the method involves applying the opacity signal to the secondary display so as to render it substantially opaque.

Another aspect of the present invention provides a display assembly for a fuel dispenser comprising a panel display and a control system operative to display money and volume information on the panel display during a fueling transaction. A secondary display is in electrical communication with the control system, the secondary display having digit structure that registers fuel dispensing information. The secondary display is configured to be substantially opaque during a fueling transaction so as to not be viewable by a customer.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
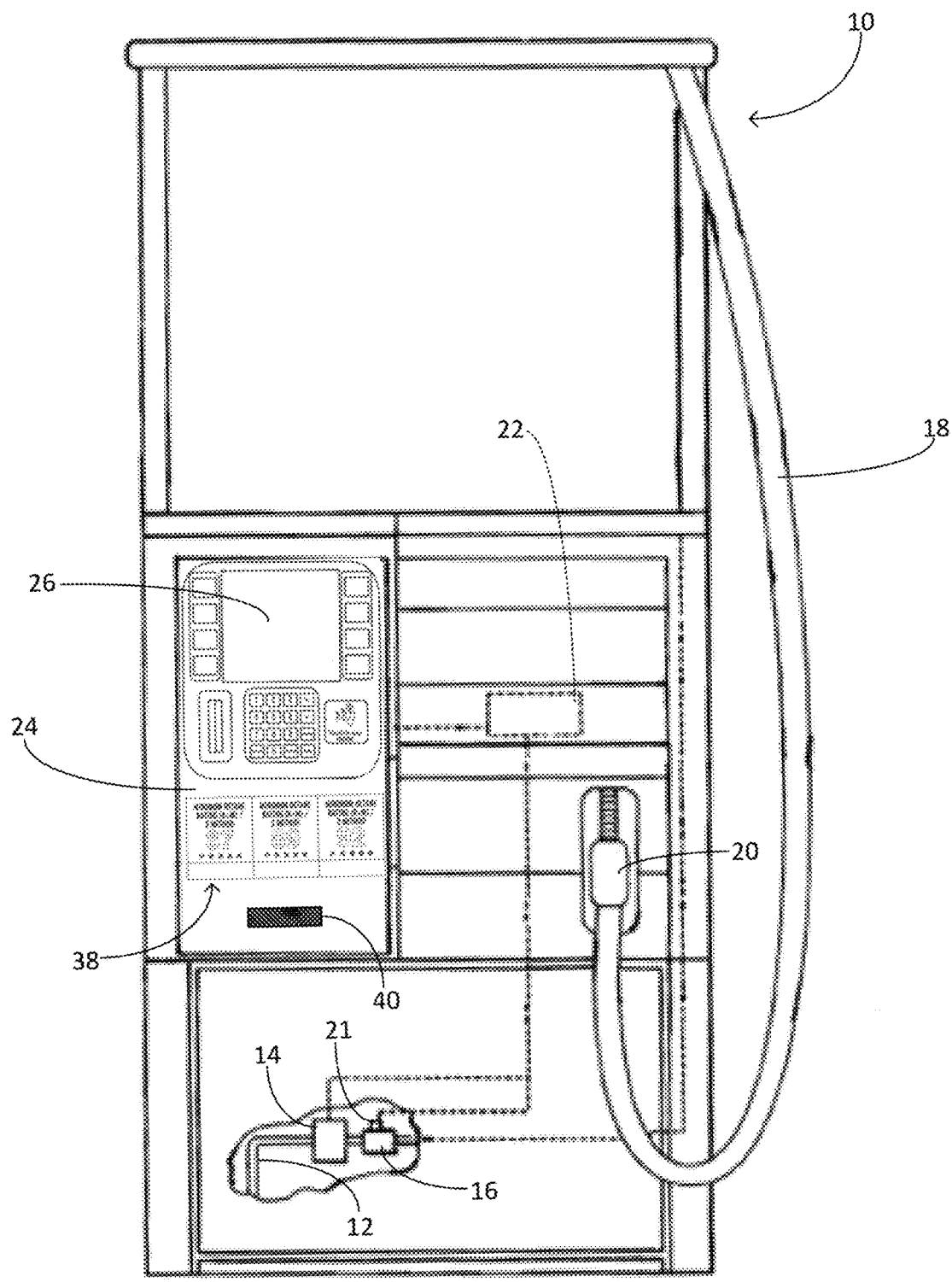
FIG. 1 is an elevational diagrammatic representation of a fuel dispenser constructed in accordance with an embodiment of the present invention.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to FIG. 1, a fuel dispenser 10 in accordance with an embodiment of the present invention is illustrated. One skilled in the art will appreciate that a retail fueling environment will typically include multiple fuel dispensers located in the forecourt adjacent a "central" building which may house a convenience store and/or a quick serve restaurant (QSR). The plurality of fuel dispensers in the retail fueling environment typically communicate with and are controlled by a site controller, such as a suitable point-of-sale (POS) system, located in the central building.

Fuel dispenser 10 includes various electrical and hydraulic components used to perform a fueling transaction. In this regard, fuel dispenser 10 typically includes internal piping 12 that interconnect fuel dispenser 10 to underground piping at the fueling site. The underground piping is itself connected to one or more underground storage tanks in which bulk quantities of fuel are stored. One or more valves 14 located in the fuel dispenser are opened when the fueling transaction is authorized in order to dispense the fuel. A flow meter 16 records the quantity of fuel passing into the customer's vehicle through hose 18 and nozzle 20.

In this embodiment, a pulser 21 associated with the flow meter 16 provides an indication of the volume of dispensed fuel to an internal control system 22. As one skilled in the art will appreciate, control system 22 typically includes suitable electronics including one or more processors (and associated memory) running software and/or firmware in order to control the fueling transaction. In this regard, control system 22 is in electrical communication with valve 14 and flow meter 16 (or pulser 21), along with a user interface 24 by which the customer (and/or attendant) may interact with the fuel dispenser.

Figure 2A:
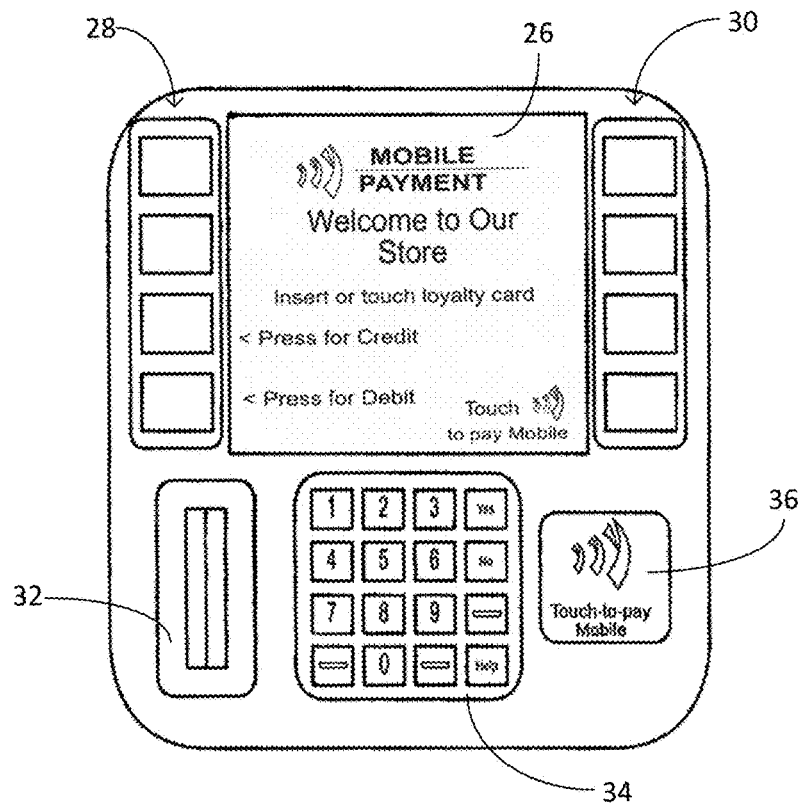
FIGS. 2A and 2B are diagrammatic representations of a portion of the user interface of the fuel dispenser of FIG. 1 with the multimedia display showing different messages.
Figure 2B:
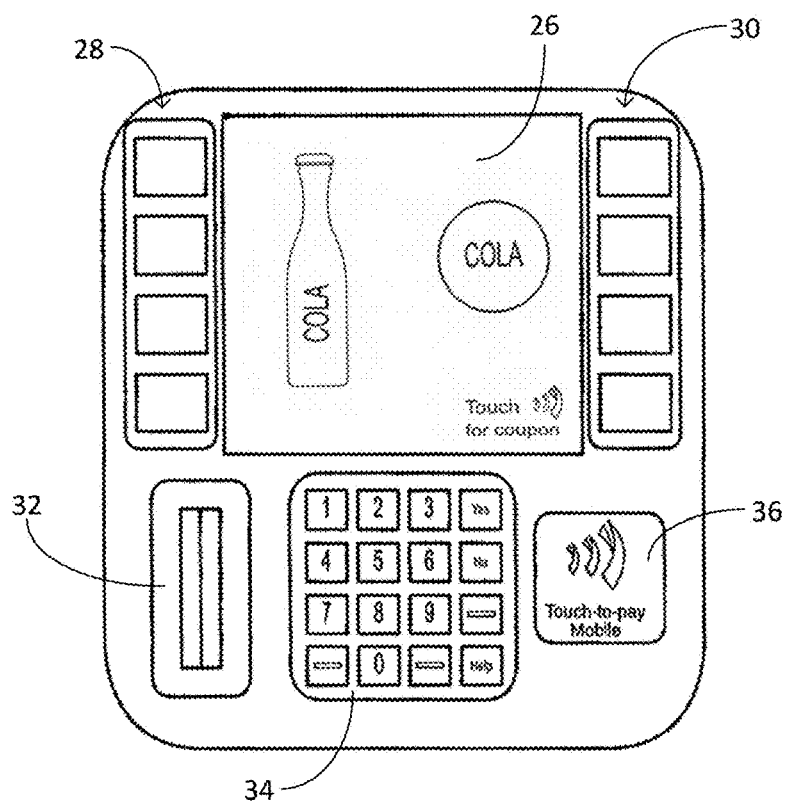

Referring now also to FIGS. 2A and 2B, interface 24 in this case includes a suitable flat panel display 26 (such as an LCD color display) beside which are located a series of "soft keys" 28 and 30. As one skilled in the art will appreciate, the soft keys allow selections to be made for corresponding choices given on display 26. For example, two of the soft keys are being used in FIG. 2A to allow selection of "credit" or "debit." Alternatively, display 26 may be a touch screen in which user selections are made directly on the screen. In FIG. 2B, display 26 is being used to show a promotion for goods that may be purchased in the convenience store. Such advertising may occur, for example, during idle times when display 26 is not being used to show fueling information (such as transaction information).

User interface 24 further includes a card reader 32 which may be configured to read a typical magnetic stripe wallet card, a smart card, or other type of wallet card as necessary or desired. A numeric "PIN" pad 34 is also provided at user interface 24. As one skilled in the art will appreciate, PIN pad 34 permits the customer to enter a personal identification number (PIN), a postal code, or some other identifier that can be used to enhance the security of a transaction. User interface 24 further includes a proximity reader 36, which is in this embodiment configured as a near-field communication (NFC) reader. As one skilled in the art will appreciate, many smart phones are now equipped with NFC payment capability.

As shown in FIG. 1, user interface 24 further includes a plurality of grade selectors (e.g., grade select buttons), collectively indicated at 38, by which a customer may select a type or grade of fuel to be dispensed. In this case, for example, grade selectors 38 allow the customer (or fuel dispenser attendant in the case of an attended fuel dispenser) to choose between one of three grades of gasoline—92 octane, 89 octane, and 87 octane. In addition, fuel dispenser 10 further includes a secondary display 40 that registers fuel dispensing information (e.g., money and volume information) as dispensing is in progress. Although it is contemplated that secondary display 40 may be positioned at any convenient location on or in fuel dispenser 10, secondary display 40 is positioned in this embodiment below grade selectors 38 on user interface 24.

Figure 3:
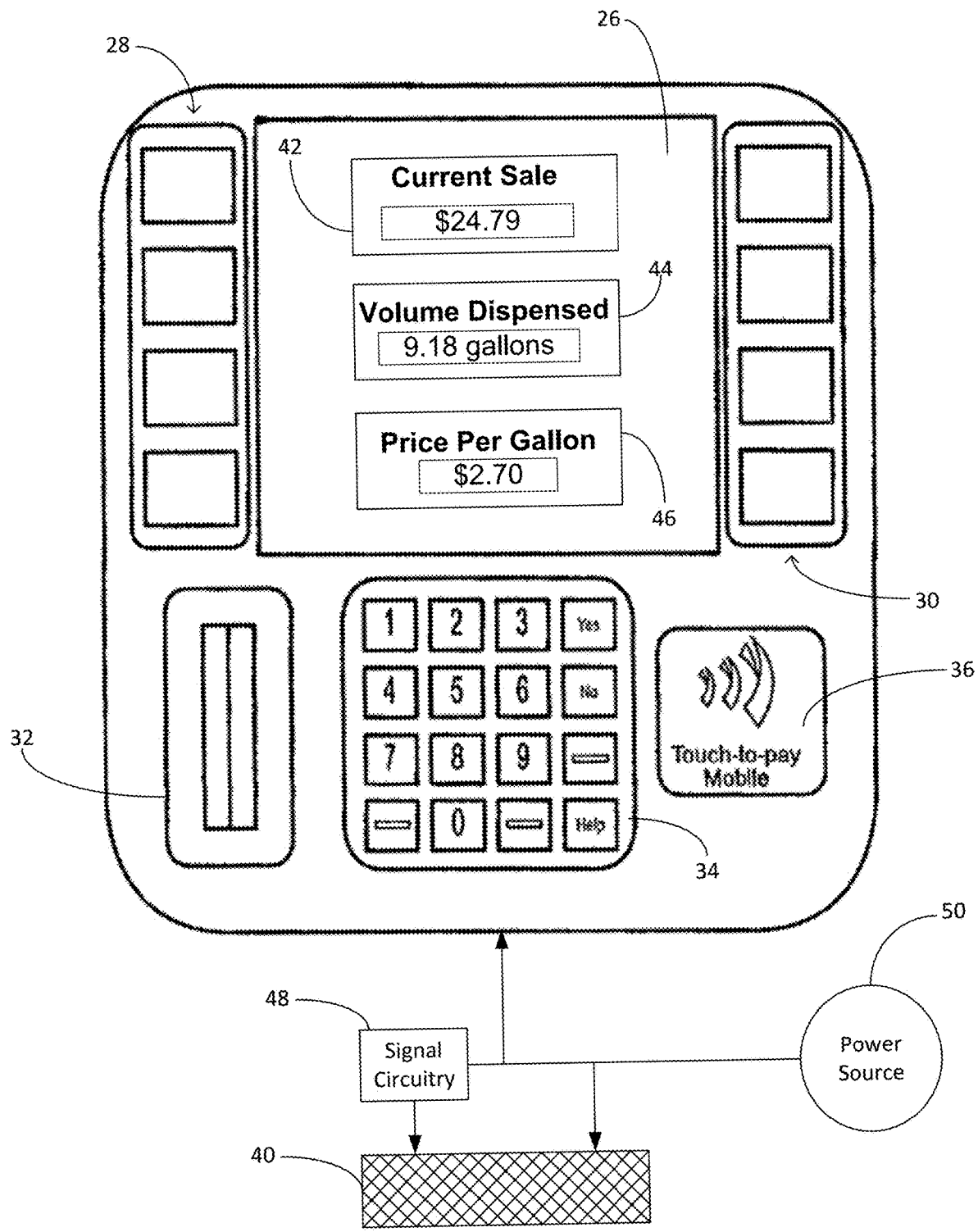
FIG. 3 is a diagrammatic representation showing the multimedia display and secondary display of the fuel dispenser of FIG. 1 as they may appear during a fueling transaction.

Referring now to FIG. 3, display 26 is used to show fuel dispensing information to the customer in this embodiment. As illustrated, for example, display 26 may show one or more of money information 42, volume information 44, and price per unit (PPU) information 46. As will be recognized, information 42 and 44 changes during the fueling process and stops when the fueling event is completed. Because display 26 is a color multimedia display in this embodiment, information 42, 44, 46 may be shown in various fonts, sizes, colors, etc. as desired by the manufacturer of fuel dispenser 10 or the operator of the service station at which fuel dispenser 10 is located. This allows a more aesthetically pleasing presentation of such information than in many prior art dispensers where separate money, volume, and PPU displays have been provided. For example, the money and volume digits shown on display 26 may be at least 24 mm tall for easy viewing. Often, the money and volume digits may fall within a range of 24 mm to 40 mm tall (e.g., approximately 38 mm tall). Rate and price per unit (PPU) digits may typically range from 12.7 mm to 19 mm tall.

Because of the weights and measures requirement to maintain money and volume information for a certain time after a loss of power (e.g., at least 15 minutes), even previous dispensers equipped with multimedia displays generally used separate, dedicated displays to show money, volume, and PPU information. In this embodiment, however, the weights and measures requirement to maintain money and volume information is satisfied by secondary display 40. The present invention recognizes that the presence of secondary display 40 might be confusing to a customer if it could be viewed during fueling. In order to prevent customer such confusion, secondary display 40 is configured to typically be opaque during the fueling process. Thus, fuel dispensing information is registered at secondary display 40 during the fueling process, but is not viewable by the customer at this time. The customer is therefore required to view display 26 as the source of such information.

For example, secondary display 40 may become non-viewable as shown in FIG. 3 when it receives an opacity signal generated by signal circuitry 48 (which may be controller 22) or when a power source 50 is active. Power source 50 may, of course, be the same power source that provides power to other components within fuel dispenser 10 such as display 26. As a result, although secondary display 40 is registering the same money and volume information as shown on display 26, it cannot be seen by the customer.

Figure 4:
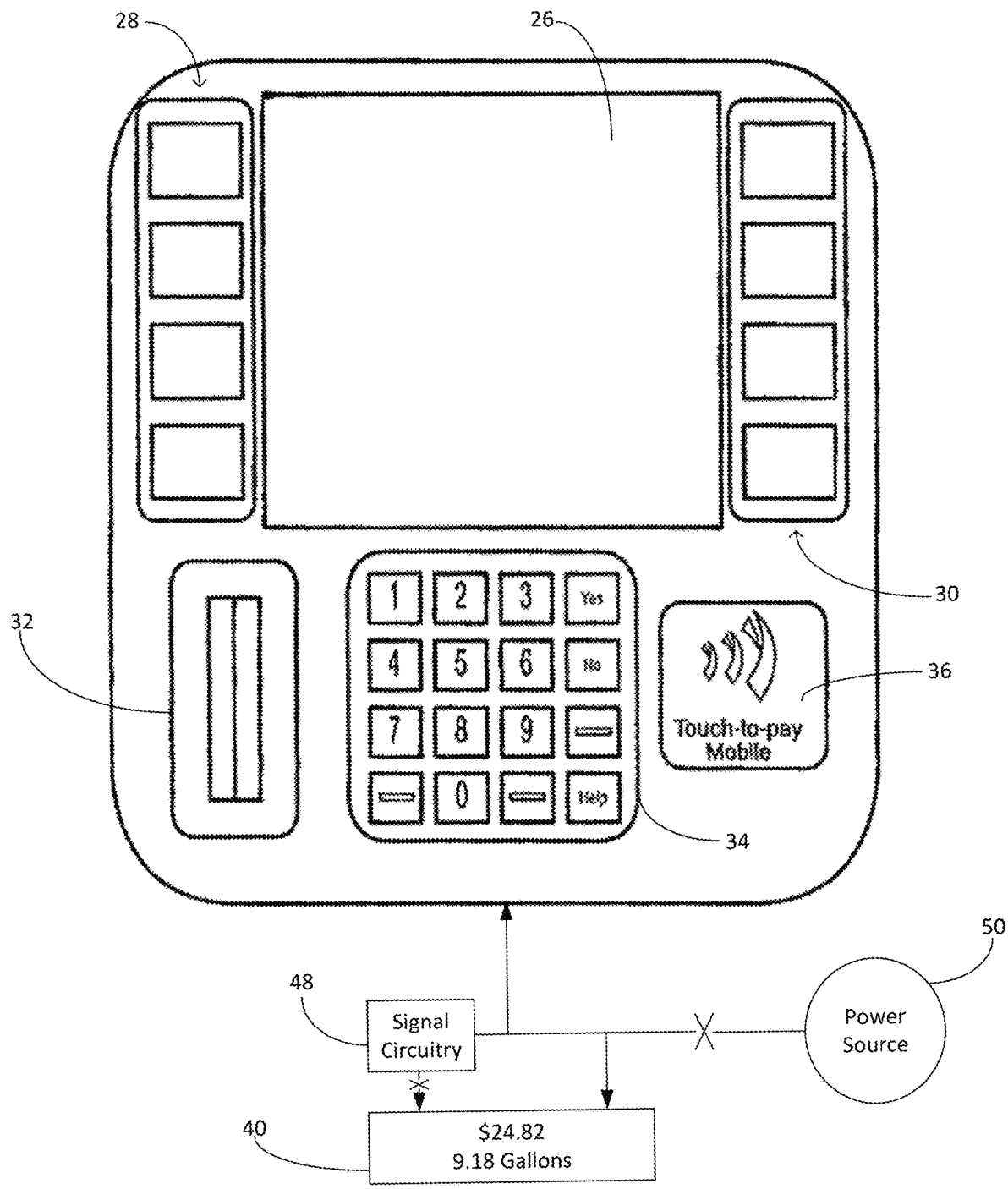
FIG. 4 is a diagrammatic representation showing the multimedia display and secondary display of the fuel dispenser of FIG. 1 as they may appear upon a loss of power.

In this regard, FIG. 4 illustrates a situation where signal circuitry 48 no longer generates the opacity signal, which may be intentional or due to the loss of power from power source 50. (Embodiments are contemplated in which the "opacity signal" is simply the presence of power being supplied by power source 50.) As shown, the loss of power from power source 50 will cause display 26 to go blank. At the same time, however, secondary display 40 will become viewable so that the information that it has been registering is revealed. Thus, in this embodiment, the last money and volume information that was being shown on display 26 will now be shown on secondary display 40. Secondary display 40 and/or its associated circuitry is constructed to maintain this information for the requisite period dictated by weights and measures requirements. Because secondary display 40 is intended to satisfy weights and measures requirements rather than provide an aesthetically pleasing experience for the customer, the size of the digits on secondary display 40 may be much smaller than those shown on display 26. For example, the digits shown on secondary display 40 may be approximately 10 mm tall in exemplary embodiments (which is the minimum height allowed by weights and measures in at least some jurisdictions).

Figure 5:
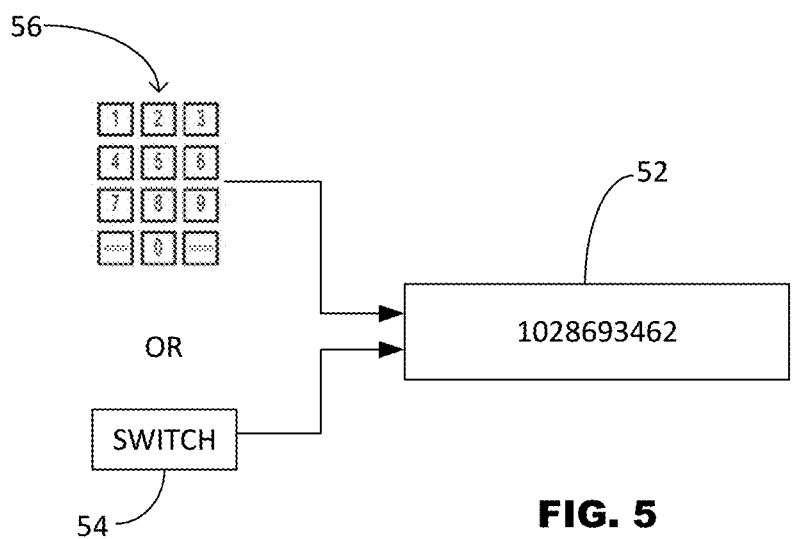
FIG. 5 is a diagrammatic representation showing a secondary display being used as a selectively viewable totalizer.

FIG. 5 illustrates an alternative embodiment in which a normally non-viewable display 52 (similar to secondary display 40) is being used as a fuel totalizer. As one skilled in the art will understand, a fuel totalizer is used to register the total volume of fuel dispensed since the beginning of a shift, or over some other period of time as selected by the dispenser manufacturer or the service station operator. However, service station operators may not want a totalizer viewable by the customer because of concerns about confusion similar to those discussed above. In addition, the station operator may not desire to allow competitors the ability to read the totalizer. These concerns are addressed in this embodiment because the volume information being registered by display 52 is normally rendered non-viewable by an opacity signal. The opacity signal is selectively removed by the operator to allow the information to be displayed, as shown. For example, the opacity signal may be controlled by a switch 54 to which the operator has access or by a keypad 56 after the operator enters a predetermined code.

In some exemplary embodiments, the secondary display 40 and/or display 52 may be configured as a negative LCD. A negative LCD has a dark background and the digits are also normally dark. The digits are registering data, but they are not visible because they are the same color as the background. The controller senses when power is going down and turns the digits lighter (e.g., white) so they become visible. Digits are held for the requisite period of time using a capacitor or small back-up power supply.

Figure 6:
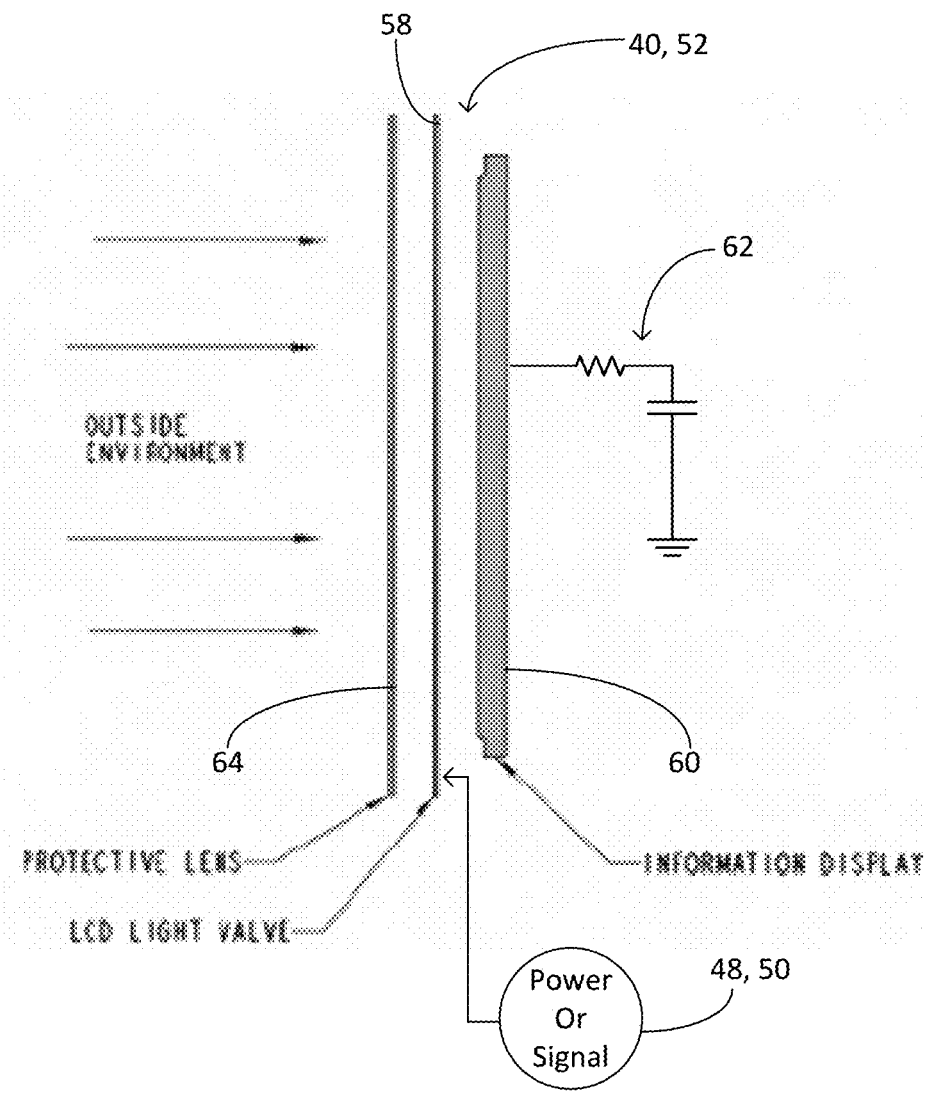
FIG. 6 is a diagrammatic representation showing certain components in a secondary display according to an embodiment of the present invention.

In other exemplary embodiments, the secondary display and/or display 52 may be constructed using a "light valve" in front of a typical backlit LCD. This is illustrated in FIG. 6, where a light valve 58 in the form of a LCD panel is juxtaposed to an informational LCD panel 60. LCD panel 60 registers the money, volume, and/or rate information. Back-up power circuitry 62 may be provided to maintain the information on panel 60 for the amount of time dictated by weights and measures requirements. A protective transparent panel ("lens") 64 is juxtaposed to light valve 58 in this embodiment.

In this case, light valve 58 is an electrically controllable mask that may be opaque or transparent at various times as desired. For example, light valve 58 may comprise a device that uses the properties of liquid crystals to control the level of illumination that is passing through it. By changing the voltage applied across it, the glass will go from about 0% to 100% dark (opaque), preventing any light from passing through it.

Figure 7:
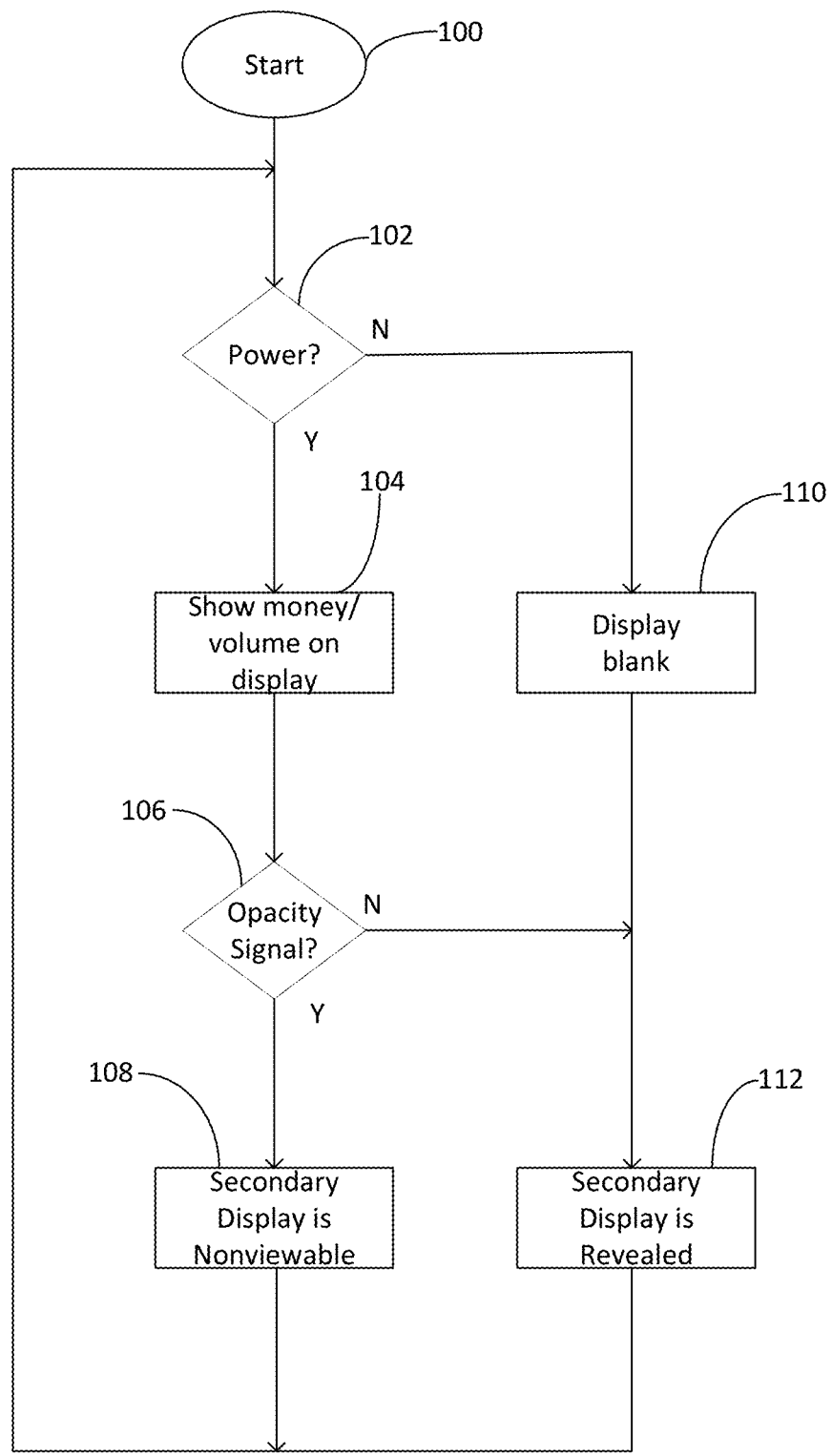
FIG. 7 is a flow chart showing certain aspects of the methodology of operation of the multimedia display and secondary display of the fuel dispenser of FIG. 1.

Referring now to FIG. 7, certain aspects of methodology in accordance with the present invention can be most easily explained. The process starts at 100. As indicated at 102, external power is either applied normally or not applied (such as in the event of a power outage). As indicated at 104, fuel dispensing information (e.g., money, volume, and/or rate information) is shown on the main display 26 if power is being applied. If an opacity signal is applied to the display 40 or 52, as indicated at 106, it will be nonviewable (as indicated at 108). If external power is not being applied, the main display 26 will be blank (as indicated at 110). Also, in the absence of external power or the absence of an opacity signal, the information registered on display 40 or 52 will be revealed (as indicated at 112).

While one or more preferred embodiments of the invention have been described above, it should be understood that any and all equivalent realizations of the present invention are included within the scope and spirit thereof. While much of the discussion above has involved fuel as the exemplary product being dispensed, one skilled in the art will recognize that aspects of the present invention are applicable to a wide variety of different goods and services. Thus, the embodiments depicted are presented by way of example only and are not intended as limitations upon the present invention. For example, many aspects of the present invention are described above in the exemplary context of a retail fueling environment. It should be understood by those of ordinary skill in this art, however, that the present invention is not limited to these embodiments because other commercial environments are contemplated and modifications can be made. Therefore, it is contemplated that any and all such embodiments are included in the present invention as may fall within the scope and spirit thereof.

What is claimed is:

1. A method of displaying fuel dispensing information on a fuel dispenser comprising:
   (a) providing a fuel dispenser having:
      a panel display;
      a control system operative to display money and volume information on the panel display during a fueling transaction;
      a secondary display in electrical communication with said control system, the secondary display having digit structure that registers the fuel dispensing information; and
      the secondary display configured to be substantially opaque when an opacity signal is applied thereto so as to not be viewable by a customer but viewable by the customer when the opacity signal is not applied thereto; and
   (b) applying the opacity signal to the secondary display so as to render it substantially opaque.

2. A fuel dispenser comprising:
   a housing enclosing fluid handling components including a fluid flow meter;
   said housing having a user interface, said user interface including a panel display;
   a control system in electrical communication with said user interface, said control system operative to display money and volume information on the panel display during a fueling transaction;
   a secondary display in electrical communication with said control system, the secondary display having digit structure that registers fuel dispensing information; and
   the secondary display configured to be not viewable by a customer as dispensing is in progress.

3. A fuel dispenser as set forth in claim 2, wherein the secondary display has an electrically controllable mask interposing the digit structure of the secondary display.

4. A fuel dispenser as set forth in claim 3, wherein the electrically controllable mask is substantially opaque when at least one of an opacity signal or power is applied.

5. A fuel dispenser as set forth in claim 3, wherein the electrically controllable mask becomes transparent when applied power is lost.

6. A fuel dispenser as set forth in claim 3, wherein the electrically controllable mask comprises a liquid crystal panel that becomes substantially opaque when activated.

7. A fuel dispenser as set forth in claim 6, wherein the secondary display comprises a backlit LCD panel forming the digit structure.

8. A fuel dispenser as set forth in claim 7, wherein the electrically controllable mask becomes transparent when applied power is lost.

9. A fuel dispenser as set forth in claim 2, wherein the secondary display comprises a negative LCD panel having a darker background when activated and lighter digits when activated.

10. A fuel dispenser as set forth in claim 2, wherein the fuel dispensing information registered by the digit structure comprises money and volume information.

11. A fuel dispenser as set forth in claim 2, wherein the fuel dispensing information comprises fuel totalizer information.

12. A fuel dispenser as set forth in claim 2, wherein the user interface further includes a plurality of grade selectors corresponding to respective fuel grades or types.

13. A fuel dispenser as set forth in claim 2, wherein digits of the secondary display are approximately 10 mm tall.

14. A display assembly for a fuel dispenser comprising:
   a panel display;
   a control system operative to display money and volume information on the panel display during a fueling transaction;
   a secondary display in electrical communication with said control system, the secondary display having digit structure that registers fuel dispensing information; and
   the secondary display configured to be substantially opaque as dispensing is in progress so as to not be viewable by a customer.

15. A display assembly for a fuel dispenser as set forth in claim 14, wherein the secondary display has an electrically controllable mask interposing the digit structure of the secondary display.

16. A display assembly for a fuel dispenser as set forth in claim 15, wherein the electrically controllable mask is substantially opaque when at least one of an opacity signal or power is applied.

17. A display assembly for a fuel dispenser as set forth in claim 15, wherein the electrically controllable mask becomes transparent when applied power is lost.

18. A display assembly for a fuel dispenser as set forth in claim 15, wherein the electrically controllable mask comprises a liquid crystal panel that becomes substantially opaque when activated.

19. A display assembly for a fuel dispenser as set forth in claim 18, wherein the secondary display comprises a backlit LCD panel forming the digit structure.

20. A display assembly for a fuel dispenser as set forth in claim 19, wherein the electrically controllable mask becomes transparent when applied power is lost.

21. A display assembly for a fuel dispenser as set forth in claim 14, wherein the secondary display comprises a negative LCD panel having a darker background when activated and lighter digits when activated.

22. A display assembly for a fuel dispenser as set forth in claim 14, wherein the fuel dispensing information registered by the digit structure comprises money and volume information.

23. A display assembly for a fuel dispenser as set forth in claim 14, wherein the fuel dispensing information comprises fuel totalizer information.

* * * * *